6. COMPOSITIONS, COATING OR PLASTIC.

Patented June 4, 1929.

1,715,977

UNITED STATES PATENT OFFICE.

CHARLES J. BATES, JR., OF ENGLEWOOD, NEW JERSEY, AND CARL P. BARTELS, OF HAMILTON, OHIO, ASSIGNORS, TO THE MOSLER SAFE COMPANY, OF HAMILTON, OHIO, A CORPORATION OF NEW YORK.

SAFE FILLING.

No Drawing. Application filed June 24, 1926. Serial No. 118,385.

This invention relates to fireproof safes, and more particularly relates to heat-insulating filling material for the walls thereof.

It is well recognized that cement has very valuable and desirable heat-insulating characteristics, which to some extent are attributable to the amount of moisture which is chemically held in the material and becomes released under high temperatures to increase the resistance to heat penetration. The moisture so held will not evaporate or become lost, and, therefore, the heat-insulating properties of cement will not deteriorate. Cement has the further advantage of being structurally strong. However, cement has certain objectionable features. It is very heavy, and when subjected to high temperatures is liable to crack and thus form openings through which heat may travel and cause damage to the contents of the safe.

The principal object of this invention is to provide a filling material for safes, or other structures, which has improved heat-insulating characteristics, and at the same time will not crack open when subjected to high temperatures. A further object of this invention is to provide a safe filling of the character described, which is comparatively light in weight and may be applied easily to the walls of safes, or other structures. A further object of this invention is to provide a material of the character described, which has no detrimental effect on the metal walls with which the filling is in contact. A further object of this invention is to provide a filling of the character described, which holds its heat-insulating properties indefinitely and practically without deterioration.

Other objects of this invention will be in part obvious and in part pointed out hereinafter.

We have discovered that a filling having all the desirable characteristics of a cement filling and lacking all of the objectionable features thereof may be provided by incorporating a vermiculite in the cement mixture, the vermiculite preferably having been heated to open out the scales. Besides, vermiculites have superior heat-insulating properties in themselves especially on account of the air cells encased therein, and are light in weight, especially after being heated. Accordingly, vermiculites constitute superior material for use in safe fillings.

Vermiculite material may be combined with cement in any proportion desired. The greater the proportion of vermiculite the lighter the filling will be in weight. The smaller the proportion of vermiculite, the more chemically bound water will be contained in the filling for release when a fire hazard is encountered.

A mixture of vermiculite material and calcined powdered diatomaceous earth and a binder, such as cement, plaster of Paris, or the like, makes a very effective heat-insulating filling for safes, or similar structures. Here, again, the proportions of the materials may be varied widely. As a specific example of one of many formulas for making satisfactory safe fillings, using a vermiculite material such as jefferisite, kerrite, maconite, or the like, we might mention a filling made up of one part by volume each of Portland cement, a vermiculite, preferably broken down to one-half inch or less, and calcined powdered diatomaceous earth. In applying the filling to a safe, water is added until the mixture has the desired degree of plasticity, whereupon it is poured between the walls of the safe and allowed to set. The manner of filling is the same as that employed when only cement is used.

The diatomaceous earth may be used uncalcined instead of calcined, or may be omitted entirely. The presence of diatomaceous earth serves to counteract any tendency of the mixture to spall off or explode when subjected to the intense temperatures of a fire. Moreover the material is light in weight and possesses valuable heat insulating and heat resisting characteristics.

As before stated, a vermiculite is a highly insulating material of itself, and is extremely light in weight. Both of these characteristics are highly desirable in safe fillings. When used with cement, it permits the incorporation of more cement per cubic foot, without the danger of the cement opening up cracks under high temperatures, and without interfering with the release of the chemically bound water from the cement by the heat of a fire. Vermiculite material has a further advantage of permitting the incorporation in the filling of other insulating materials, such as diatomaceous earth and the like.

As many changes could be made in the above filling without departing from the scope of the invention, it is intended that all matter contained in the above description shall be interpreted as illustrative and not in a limiting sense.

What we claim is:

1. A heat-insulating filling for safes and the like, which includes vermiculite material, diatomaceous earth, and a binder.

2. A heat-insulating filling for safes and the like, which includes vermiculite material, diatomaceous earth, and cement.

3. A heat insulating filling for safes and the like, which includes the mixture of vermiculite material, a binder, and a diatomaceous substance which tends to prevent the mixture from spalling off when subjected to the heat of a conflagration.

4. A heat insulating filling for safes and the like, which includes the mixture of a cement-like substance, vermiculite material, and diatomaceous material, the vermiculite material tending to prevent the opening of cracks through the filling, and the diatomaceous material tending to prevent the spalling off of the filling, when the filling is subjected to the heat of a conflagration.

This specification signed this 21 day of June, 1926.

C. J. BATES, Jr.
CARL P. BARTELS.